US012700748B2

(12) United States Patent
Wang et al.

(10) Patent No.: US 12,700,748 B2
(45) Date of Patent: Aug. 4, 2026

(54) CHARGING CONTROL METHOD, CHARGING CONTROL DEVICE, ELECTRONIC DEVICE, AND STORAGE MEDIUM

(71) Applicant: CONTEMPORARY AMPEREX TECHNOLOGY (HONG KONG) LIMITED, Hong Kong (CN)

(72) Inventors: Haijiang Wang, Ningde (CN); Ming Ni, Ningde (CN); Haili Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 197 days.

(21) Appl. No.: 18/623,491

(22) Filed: Apr. 1, 2024

(65) Prior Publication Data

US 2024/0250546 A1     Jul. 25, 2024

Related U.S. Application Data

(63) Continuation of application No. PCT/CN2022/096292, filed on May 31, 2022.

(51) Int. Cl.
*H02J 7/00* (2026.01)
*B60L 58/24* (2019.01)
(Continued)

(52) U.S. Cl.
CPC ................ *H02J 7/92* (2026.01); *B60L 58/24* (2019.02); *H02J 7/82* (2026.01); *H02J 7/977* (2026.01); *B60L 2240/545* (2013.01)

(58) Field of Classification Search
CPC ........... B60L 2240/80; B60L 2240/545; B60L 2260/42; B60L 3/12; B60L 53/62;
(Continued)

(56) References Cited

U.S. PATENT DOCUMENTS

2013/0307475 A1     11/2013   Kishiyama et al.
2015/0123595 A1     5/2015    Hussain et al.

FOREIGN PATENT DOCUMENTS

CN     107769324 A   *   3/2018    ............ H02J 7/0086
CN     110828924 A       2/2020
(Continued)

OTHER PUBLICATIONS

International Search Report for PCT application No. PCT/CN2022/096292, dated Jan. 18, 2023.
(Continued)

*Primary Examiner* — Julian D Huffman
*Assistant Examiner* — Sadia Kousar
(74) *Attorney, Agent, or Firm* — Ladas & Parry LLP

(57)     ABSTRACT

This application provides a charging control method, a charging control device, an electronic device, and a storage medium. The charging control method includes: obtaining fastest-charge data, where a charging time in the fastest-charge data is less than or equal to a minimum charging time for a same state-of-charge (SOC) increment section in historical charging processes; and performing charging control on a battery based on the fastest-charge data. By obtaining the fastest-charge data and performing charging control on the battery based on the fastest-charge data, the charging control method according to this application can ensure that the charging time is close to or equal to the minimum charging time in historical charging processes, thereby effectively increasing the charging speed.

13 Claims, 4 Drawing Sheets

Obtain fastest-charge data, where a charging time in the fastest-charge data is less than or equal to a minimum charging time for a same state-of-charge SOC increment section in historical charging processes — S10

Perform charging control on a battery based on the fastest-charge data — S20

(51) Int. Cl.
*H02J 7/82*       (2026.01)
*H02J 7/90*       (2026.01)
*H02J 7/92*       (2026.01)

(58) Field of Classification Search
CPC ...... B60L 53/66; B60L 58/24; H02J 7/00032;
H02J 7/00309; H02J 7/0048; H02J
7/0071; H02J 7/00712
See application file for complete search history.

(56)       References Cited

FOREIGN PATENT DOCUMENTS

| CN | 110843600 | A | | 2/2020 | |
| CN | 112230147 | A | | 1/2021 | |
| CN | 112865216 | A | | 5/2021 | |
| CN | 114179679 | A | * | 3/2022 | ............. B60L 58/27 |
| JP | 2013009539 | A | | 10/2013 | |

OTHER PUBLICATIONS

Written Opinion of International Searching Authority for PCT
application No. PCT/CN2022/096292, dated Jan. 18, 2023.
Notice of Reasons for Refusal, JP application No. 2024-524738,
dated Apr. 22, 2025.
Decision to Grant a Patent dated Jul. 24, 2025 for application JP
2024-524738.
Extended European Search Report for EP application No. 22944195.
1, dated Oct. 12, 2024.
Request for the Submission of an Opinion, KR application No.
10-2024-7013119, dated Dec. 12, 2025.

* cited by examiner

CHARGING CONTROL METHOD, CHARGING CONTROL DEVICE, ELECTRONIC DEVICE, AND STORAGE MEDIUM

CROSS REFERENCE TO RELATED APPLICATION

This application is a continuation of International Patent Application No. PCT/CN2022/096292, filed on May 31, 2022, which is incorporated by reference in its entirety.

TECHNICAL FIELD

This application relates to the field of battery technology, and in particular, to a charging control method, a charging control device, an electronic device, and a storage medium.

BACKGROUND

New energy electric vehicles use power batteries as power sources. By virtue of the advantages of high energy density, rechargeability, safety, and environmentally friendliness of the power batteries, the market share of new energy electric vehicles is increasingly higher. The charging speed has become one of the electric vehicle performance indicators that many consumers are most concerned about in purchasing a new energy electric vehicle. Especially, during a long-distance travel, when the electric vehicle incurs a low battery and needs to be recharged, a relatively high charging speed can save the charging time and alleviate the anxiety of car owners during the charging. The prior art lacks a technical solution to increasing the charging speed by controlling the charging process of a power battery.

SUMMARY

An embodiment of this application provides a charging control method, a charging control device, an electronic device, and a storage medium to increase the charging speed by controlling a charging process of a power battery.

According to a first aspect, a charging control method is provided, including:

obtaining fastest-charge data, where a charging time in the fastest-charge data is less than or equal to a minimum charging time for a same state-of-charge (SOC) increment section in historical charging processes; and performing charging control on a battery based on the fastest-charge data.

By obtaining the fastest-charge data and performing charging control on the battery based on the fastest-charge data, the charging control method according to this embodiment of this application can ensure that the charging time is close to or equal to the minimum charging time in the historical charging processes, thereby effectively increasing the charging speed.

In an implementation, the fastest-charge data includes at least one SOC increment section and a maximum battery temperature corresponding to each SOC increment section.

The performing charging control on a battery based on the fastest-charge data includes:

performing thermal management control on the battery based on a current battery temperature and a maximum battery temperature corresponding to a current SOC increment section, thereby ensuring efficient and accurate thermal management control for the battery and avoiding safety hazards caused by battery over-temperature during charging.

In an implementation, the performing thermal management control on the battery based on a current battery temperature and a maximum battery temperature corresponding to a current SOC increment section includes:

determining a SOC increment section within which a real-time SOC value falls;

obtaining, from the fastest-charge data, a maximum battery temperature corresponding to the determined SOC increment section; and performing control to execute a corresponding thermal management policy of the battery based on the real-time battery temperature and the obtained maximum battery temperature. In this way, accurate and efficient thermal management is implemented for a battery charging process, thereby avoiding safety hazards caused by battery over-temperature during charging.

In an implementation, the performing thermal management control on the battery based on a current battery temperature and a maximum battery temperature corresponding to a current SOC increment section includes:

determining a SOC increment section within which a real-time SOC value falls;

obtaining, from the fastest-charge data, a maximum battery temperature corresponding to the determined SOC increment section; and performing control to execute a corresponding thermal management policy of the battery based on the real-time battery temperature and the obtained maximum battery temperature. In this way, accurate and efficient thermal management can be implemented for a battery charging process.

In an implementation, the performing control to execute a corresponding thermal management policy of the battery based on the real-time battery temperature and the obtained maximum battery temperature includes:

determining a target temperature range corresponding to the obtained maximum battery temperature; and performing, when the real-time battery temperature is higher than an upper limit of the target temperature range, cooling on the battery until the real-time temperature is less than or equal to the upper limit; or performing, when the real-time battery temperature is less than or equal to a lower limit of the target temperature range, heating on the battery until the real-time battery temperature is higher than the lower limit. Through the thermal management policy for the battery, it is ensured that, during a charging process of the battery, when the real-time battery temperature is not within the target temperature range, the real-time battery temperature is adjusted to the target temperature range in time, thereby implementing effective and precise control for the battery temperature.

In an implementation, the method further includes:

determining, after a current charging process ends, whether charging data in the current charging process satisfies a preset fast-charge condition; and updating the fastest-charge data based on the charging data in the current charging process when the charging data in the current charging process satisfies the preset fast-charge condition. The update of the fastest-charge data ensures that the fastest-charge data remains optimal in historical charging processes, so as to further increase the battery charging speed.

In an implementation, the fastest-charge data includes at least one SOC increment section and a charging time corresponding to each SOC increment section, and the determining whether charging data in the current charging process satisfies a preset fast-charge condition includes:

determining a maximum temperature of a battery during the current charging process;

determining a SOC increment overlap section between the current charging process and the fastest-charge data;

determining a first charging time corresponding to the SOC increment overlap section in the current charging process and determining a second charging time corresponding to the SOC increment overlap section in the fastest-charge data;

determining, when the maximum temperature is less than or equal to a preset threshold and the first charging time is less than the second charging time, that the charging data corresponding to the first charging time in the current charging process satisfies the preset fast-charge condition. In this way, the charging data compliant with the preset fast-charge condition can be found accurately in the current charging process.

In an implementation, the updating the fastest-charge data based on the charging data in the current charging process includes:

determining a corresponding SOC increment overlap section in the fastest-charge data based on the SOC increment section corresponding to the first charging time in the current charging process; and replacing the charging data of the corresponding SOC increment overlap section in the fastest-charge data with partial charging data corresponding to the first charging time in the current charging process. In this way, the fastest-charge data is ensured to keep optimal.

In an implementation, the determining whether charging data in the current charging process satisfies a preset fast-charge condition includes:

adding one to a cumulative number of safe charges when a maximum temperature of a battery in the current charging process is less than or equal to a preset threshold; and determining, when the number of safe charges reaches a preset number after one is added, that the charging data in the current charging process satisfies the preset fast-charge condition; or buffering the charging data in the current charging process when the number of safe charges is less than a preset number after one is added. By letting the preset fast-charge condition be that the number of safe charges reaches the preset number, it is ensured that the obtained charging data is data of safe charging. This favorably ensures the safety of the fastest-charge data that is to be subsequently updated with the data selected from the data of safe charging, and in turn, ensures the safety of the battery charging process when the thermal management policy for battery charging is executed subsequently based on the fastest-charge data.

In an implementation, the updating the fastest-charge data based on the charging data in the current charging process includes:

determining a SOC overlap section and a non-overlap section between the charging data buffered during the preset number of charges, where the SOC overlap section is a SOC increment section shared by at least two pieces of charging data;

determining a minimum charging time of each SOC overlap section and each non-overlap section separately based on the charging data in the preset number of charges; and updating the fastest-charge data based on the minimum charging time of each SOC overlap section and each non-overlap section to ensure that the fastest-charge data keeps optimal.

In an implementation, the determining a minimum charging time of each SOC overlap section and each non-overlap section separately based on the charging data in the preset number of charges includes:

determining, from a plurality of pieces of charging data that share a first SOC overlap section, the minimum charging time corresponding to the first SOC overlap section, where the first SOC overlap section is any one SOC overlap section of all SOC overlap sections; and determining that the charging time corresponding to the non-overlap section in the charging data pertinent to the non-overlap section is the minimum charging time corresponding to the non-overlap section. The minimum charging time of each overlap section and each non-overlap section can be searched out accurately, so as to facilitate subsequent update of the fastest-charge data.

In an implementation, the updating the fastest-charge data based on the minimum charging time of each SOC overlap section and each non-overlap section includes:

determining whether the minimum charging time for a first section is less than the charging time corresponding to a same section in the fastest-charge data, where the first section is any one section among all SOC overlap sections and all non-overlap sections; and replacing the charging data corresponding to the same section in the fastest-charge data with partial charging data corresponding to the first section when the minimum charging time for a first section is less than the charging time corresponding to the same section in the fastest-charge data. By updating the fastest-charge data, the fastest-charge data can be ensured to remain optimal in historical charging processes.

In an implementation, the updating the fastest-charge data based on the charging data in the current charging process includes:

selecting a random piece of charging data from the charging data buffered during the preset number of charges;

determining a SOC increment overlap section between the selected charging data and the fastest-charge data, and determining a first charging time corresponding to the SOC increment overlap section in the selected charging data as well as a second charging time corresponding to the SOC increment overlap section in the fastest-charge data;

replacing, when the first charging time is less than the second charging time, the charging data of the SOC increment overlap section in the fastest-charge data with partial charging data corresponding to the first charging time in the selected charging data; and selecting a random piece of charging data again from remaining charging data, and returning to cyclically perform the step of determining the SOC increment overlap section between the selected charging data and the fastest-charge data until the fastest-charge data is updated with each piece of charging data in the preset number of charges. By updating the fastest-charge data, the fastest-charge data can be ensured to remain optimal in historical charging processes.

According to a second aspect, a charging control device is provided, including:

an obtaining module, configured to obtain fastest-charge data, where a charging time in the fastest-charge data is less than or equal to a minimum charging time for a same state-of-charge (SOC) increment section in historical charging processes; and a control module, configured to perform control to execute a corresponding thermal management policy of the battery based on the fastest-charge data and the real-time charging data in the current charging process.

By obtaining the fastest-charge data and performing charging control on the battery based on the fastest-charge data, the charging control device can increase the charging speed, and ensure that the charging time is close to or equal to the minimum charging time in the historical charging processes.

According to a third aspect, an electronic device is provided, including a memory, a processor, and a computer program stored in the memory and executable on the processor. The processor executes the program to implement the charging control method according to any one of the implementations described above. The electronic device can achieve the same beneficial technical effects as the charging control method according to the first aspect.

According to a fourth aspect, a computer-readable storage medium is provided, on which a computer program is stored. A processor executes the program to implement the charging control method according to any one of the implementations described above. The computer-readable storage medium can achieve the same beneficial technical effects as the charging control method according to the first aspect.

According to the fifth aspect, a powered apparatus is provided. The powered apparatus includes a power battery and the electronic device according to the third aspect. The power battery is configured to provide electrical energy. The electronic device is configured to perform the charging control method according to any one of the implementations described above. The powered apparatus can achieve the same beneficial technical effects as the charging control method according to the first aspect.

BRIEF DESCRIPTION OF DRAWINGS

To describe the technical solutions of some embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

DETAILED DESCRIPTION

Figure 1:
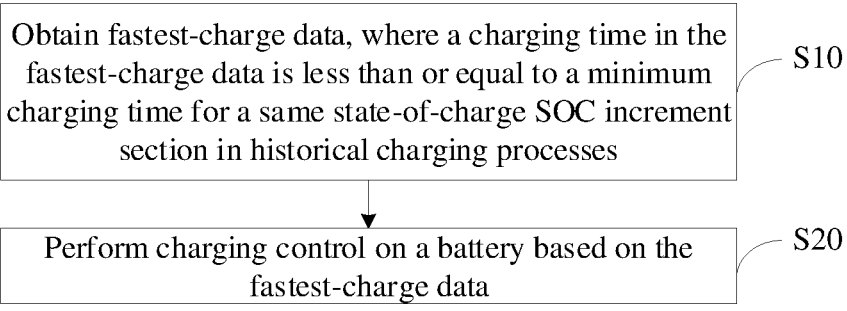
FIG. 1 is a flowchart of a charging control method according to some embodiments of this application.

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned device or component is necessarily located in the specified direction or constructed or operated in the specified direction. Therefore, such terms are not to be understood as a limitation on this application. In addition, the terms "first", "second", "third", and so on are merely used for descriptive purposes, but not construed as indicating or implying relative importance. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

With the development of science and technology and the progress of the times, by virtue of the advantages such as environmental protection performance, low noise, and low cost of use, the new energy vehicles effectively promote energy conservation and emission reduction, meet environmental protection requirements, contribute to sustainable development of social economy, and are taking up an increasingly higher market share.

A new energy vehicle uses a power battery as a power source. Especially, lithium-ion batteries are the most commonly used power batteries. The applicant hereof finds that, due to the chemical characteristics of power batteries such as a lithium-ion battery, temperature is the greatest one of ambient influential factors to affect the charging speed of the battery. The higher the temperature, the more intense the molecular motion. Electrochemical reactions inside the power battery and activity of chemical substances are all affected by temperature. Increasing the temperature of a battery cell can significantly increase the charging speed of the battery. However, during the charging process of electric vehicles, if the temperature of the battery pack keeps increasing under persistent control during charging, the temperature of a battery system will be excessive and exceed an upper-limit temperature of the battery system, thereby resulting in unstable chemical properties inside the battery and giving rise to safety hazards. A battery management system (BMS) of an electric vehicle uses a related control policy and a control algorithm to balance the charging speed, and is one of the effective methods for improving the charging safety and the charging speed.

A power battery mentioned in an embodiment of this application may be a lithium-ion battery, a lithium metal battery, a lead-acid battery, a nickel-cadmium battery, a nickel-hydrogen battery, a lithium-sulfur battery, a lithium-air battery, a sodium-ion battery, or the like, and the type of the power battery is not limited herein. In terms of the size of the battery, a battery in an embodiment of this application may be a battery cell, or a battery module or a battery pack. The form of the battery is not limited herein. In terms of application scenarios, the battery is applicable in a powered apparatus such as an automobile or a ship. For example, the battery may be used in an electric vehicle, supply power to the motor of the electric vehicle, and serve as a power source of an electric vehicle. The battery can also supply power to other electrical devices in the electric vehicle, for example, an in-vehicle air conditioner, an in-vehicle player, or the like.

For ease of description, the following uses an example in which the power battery is applied to a new energy vehicle (electric vehicle). When a vehicle is fed with high voltage to start fast charging, a charging gun is inserted into the vehicle to charge the vehicle. Information is exchanged between the charging pile and the vehicle, and internal communication is performed between the vehicle and a battery management system (BMS). The BMS calculates a currently acceptable charging capacity of the battery cell based on current information such as voltage, temperature, and SOC, and sends the calculation result to the vehicle system and the charging pile. Upon receiving the information about the requested charging current from the BMS, the charging pile responds in time and outputs the relevant requested charging current. During the charging, increasing the charging temperature can increase the charging speed of a lithium-ion battery, but it is necessary to consider the thermal safety in the charging process at the same time. The charging control method according to this embodiment of this application performs charging control on the battery based on the fastest-charge data. The charging time in the fastest-charge data is less than or equal to the minimum charging time for the same state-of-charge (SOC) increment section in the historical charging processes, thereby ensuring that the charging time is close to or equal to the minimum charging time in the historical charging processes, and in turn, effectively increasing the charging speed.

An embodiment of this application provides a charging control method. As shown in FIG. 1, in some implementations, the method includes steps S10 to S20:

S10. Obtain fastest-charge data, where a charging time in the fastest-charge data is less than or equal to a minimum charging time for a same state-of-charge (SOC) increment section in historical charging processes.

The obtaining the fastest-charge data may include: obtaining the currently stored fastest-charge data from a preset storage space, where the fastest-charge data is determined based on the historical charging data in the historical charging processes of the battery. The preset storage space may be, for example, a storage space in a nonvolatile memory (NVM).

The currently stored fastest-charge data may include at least one SOC increment section, a maximum battery temperature corresponding to each SOC increment section, and a charging time corresponding to each SOC increment section. For example, a total SOC section included in the fastest-charge data may be [17%, 96%], the total SOC section [17%, 96%] may be divided into 20 SOC increment section, and each SOC increment section corresponds to one charging time. For another example, the total SOC section included in the fastest-charge data may be [0%, 100%], the total SOC section [0%, 100%] may be divided into 50 SOC increment sections, and each SOC increment section corresponds to one charging time, as detailed in Table 1. The length of the SOC increment sections may be the same or different, and may be specifically set according to actual needs.

TABLE 1

| SOC increment section | Maximum battery temperature (° C.) | Charging time (s) |
| --- | --- | --- |
| [0%, 2%] | 35 | 10 |
| (2%, 4%] | 38 | 14 |
| (4%, 6%] | 42 | 19 |
| . . . | . . . | . . . |
| (96%, 98%] | 45 | 26 |
| (98%, 100%] | 53 | 32 |

Figure 2:
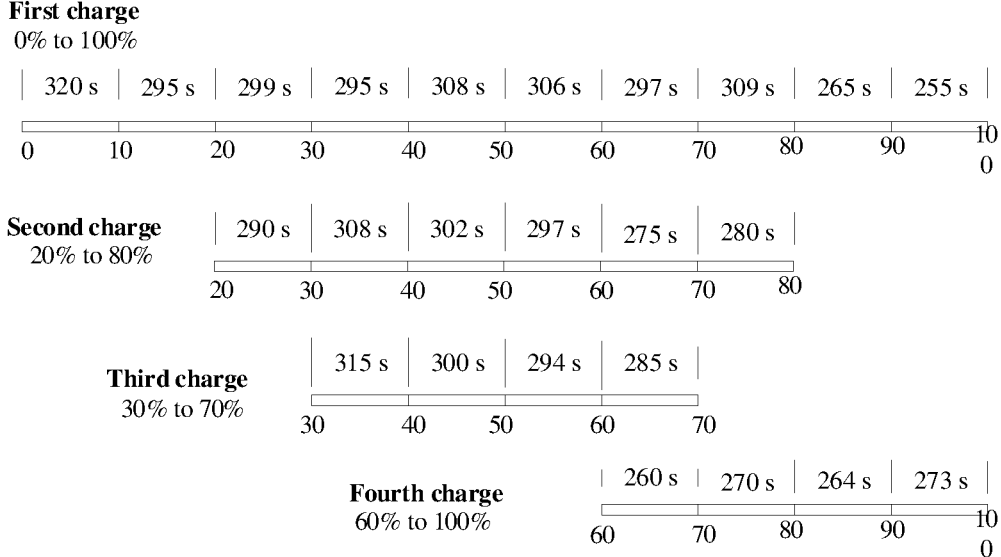
FIG. 2 is a schematic diagram of charging data in four historical charging processes in a specific example.

FIG. 2 shows historical charging data of four historical charging processes in a specific example, in which the SOC increment sections are arranged in units of 10%. That is, the length of each SOC increment section is 10%. The SOC increases from 0% to 100% in the first charging process, increases from 20% to 80% in the second charging process, increases from 30% to 70% in the third charging process, and increases from the 60% to 100% in the fourth charging process. The charging time and the maximum battery temperature (the maximum battery temperature is not shown in FIG. 2) for each SOC increment section are recorded and saved in each charging process.

In some embodiments, the determining the fastest-charge data based on the historical charging data in the historical charging processes of the battery may include:

dividing the maximum SOC section [0, 100%] into 50 SOC sections in units of 2%, storing the maximum temperature value corresponding to each SOC section in the historical charging data in the historical charging processes and the corresponding charging time in a nonvolatile memory (NVM);

recording the calendar time of entering the charging state and a start SOC of charging when the electric vehicle enters a charging state; temporarily storing the current maximum battery temperature and the charging time for each SOC section in the charging process based on the real-time state-of-charge (SOC) in the charging process; storing one value of the maximum battery temperature and a value of the charging time each time the SOC increases by 2%; recording the calendar time at the end of the charging state and the SOC at the end of charging when the current charging section ends, and calculating the total duration of the current charging process at the same time; and calculating the corresponding charging time stored in the NVM based on the start SOC value of charging and the SOC value at the end of charging; and purging the maximum temperature value corresponding to the SOC section stored in the NVM and the charging time value corresponding to the SOC section and updating the values with the maximum temperature corresponding to the SOC section and the charging time corresponding to the SOC section in the current charging process if the total time in the current charging process is less than the charging time stored in the NVM and the maximum temperature in the current charging process does not exceed a safe temperature upper limit in the battery system.

S20. Perform charging control on a battery based on the fastest-charge data.

In some embodiments, the fastest-charge data includes at least one SOC increment section and a maximum battery temperature corresponding to each SOC increment section. Step S20 may include: performing thermal management control on the battery based on a current battery temperature and a maximum battery temperature corresponding to a current SOC increment section, thereby ensuring efficient and accurate thermal management control for the battery and avoiding safety hazards caused by battery over-temperature during charging.

The number of SOC increment sections included in the fastest-charge data may be set according to actual needs. For example, the SOC increment sections may be arranged in units of 2%, 3%, 5%, 10%, for example. The total SOC increment section in the fastest-charge data may be [0, 100%], [20%, 90%], or [10%, 98%], for example, and may be specifically set according to actual needs.

In a specific example, the fastest-charge data may include 50 equal-sized SOC increment sections. The 50 SOC increment sections are a result of dividing the SOC (0 to 100%) in units of 2%, and are [0, 2%), [2%, 4%), [4%, 6%), . . . , [98%, 100%], respectively. Each SOC increment section corresponds to a maximum battery temperature. The 50 SOC increment sections correspond to 50 maximum battery temperatures.

In some embodiments, the performing thermal management control on the battery based on a current battery temperature and a maximum battery temperature corresponding to a current SOC increment section may include: determining a SOC increment section within which a real-time SOC value falls; obtaining, from the fastest-charge data, a maximum battery temperature corresponding to the determined SOC increment section; and performing control to execute a corresponding thermal management policy of the battery based on the real-time battery temperature and the obtained maximum battery temperature. In this way, accurate and efficient thermal management is implemented for a battery charging process, thereby avoiding safety hazards caused by battery over-temperature during charging.

For example, if it is detected that the real-time SOC value is 51%, then the real-time SOC value 51% falls within the SOC increment section [51%, 52%) described in the above specific example. The maximum battery temperature corresponding to the SOC increment section [51%, 52%) in the above specific example is 58° C. The corresponding thermal management policy of the battery is executed under control based on the detected real-time battery temperature and the maximum battery temperature 58° C. corresponding to the SOC increment section [51%, 52%).

In some embodiments, step S203 includes: determining a target temperature range corresponding to the obtained maximum battery temperature; and performing, when the real-time battery temperature is higher than an upper limit of the target temperature range, cooling on the battery until the real-time battery temperature is less than or equal to the upper limit; or, performing, when the real-time battery temperature is less than or equal to a lower limit of the target temperature range, heating on the battery until the real-time battery temperature is higher than the lower limit. Through the thermal management policy for the battery, it is ensured that, during a charging process of the battery, when the real-time battery temperature is not within the target temperature range, the real-time battery temperature is adjusted to the target temperature range in time, thereby implementing effective and precise control for the battery temperature.

For example, the target temperature range corresponding to the obtained maximum battery temperature 58° C. is [56° C., 60° C.], the upper limit of the target temperature range [56° C., 60° C.] is 60° C., and the lower limit is 56° C. When the real-time battery temperature is higher than 60° C., cooling is performed on the battery until the real-time battery temperature is less than or equal to 60° C. When the real-time battery temperature is less than or equal to 56° C., heating is performed on the battery until the real-time battery temperature is higher than 56° C. The difference between the temperature corresponding to the current start SOC and the target temperature affects the final charging time. The larger the difference, the greater the impact on the final charging time. The coefficient in the charging process may be adjusted by means of coefficient correction or other means.

Figure 3:
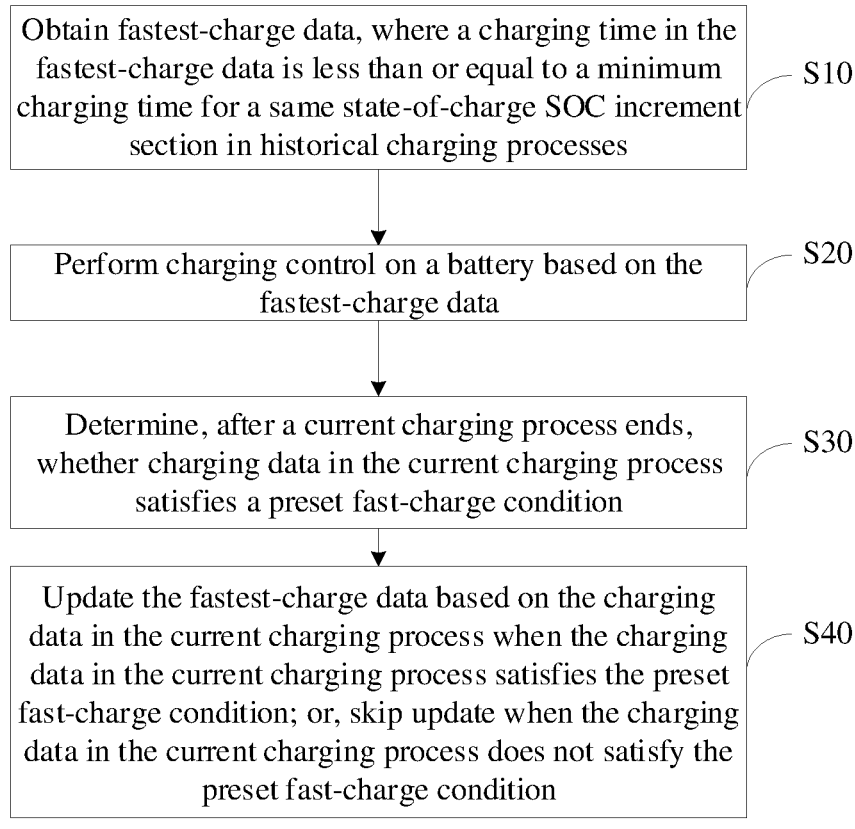
FIG. 3 is a flowchart of a charging control method according to some other embodiments of this application.

In some embodiments, as shown in FIG. 3, the charging control method further includes steps S30 to S40:

S30. Determine, after a current charging process ends, whether charging data in the current charging process satisfies a preset fast-charge condition.

In some embodiments, the fastest-charge data includes at least one SOC increment section and a charging time corresponding to each SOC increment section. That is, the fastest-charge data records the corresponding charging time for each SOC section, thereby making it convenient to accurately determine the minimum charging time whenever the start SOC of charging is indefinite. Even if the start SOC of charging is indefinite in a charging process, the minimum charging time for the corresponding SOC increment section can still be determined based on the current SOC value and the corresponding SOC increment section in the fastest-charge data.

In a specific example, the fastest-charge data may include 50 equal-sized SOC increment sections. The 50 SOC increment sections are a result of dividing the SOC (0 to 100%) in units of 2%, and are [0, 2%), [2%, 4%), [4%, 6%), . . . , [98%, 100%], respectively. Each SOC increment section corresponds to a charging time. The 50 SOC increment sections correspond to 50 charging times.

In some embodiments, the determining whether charging data in the current charging process satisfies a preset fast-charge condition may include: determining a maximum temperature of a battery during the current charging process; determining a SOC increment overlap section between the current charging process and the fastest-charge data; determining a first charging time corresponding to the SOC increment overlap section in the current charging process and determining a second charging time corresponding to the SOC increment overlap section in the fastest-charge data; determining, when the maximum temperature is less than or equal to a preset threshold and the first charging time is less than the second charging time, that the charging data corresponding to the first charging time in the current charging process satisfies the preset fast-charge condition. In this way, the charging data compliant with the preset fast-charge condition can be found accurately in the current charging process.

For example, it is assumed that the maximum temperature of the battery in the current charging process is 62° C. The SOC increment section in the current charging process is [50%, 100%]. That is, the SOC increases from 50% to 100% in the current charging process. Therefore, the SOC increment overlap section between the current charging process and the fastest-charge data is [50%, 100%]. For example, the first charging time corresponding to the current charging process is 15 minutes, and the second charging time corresponding to the SOC increment section [50%, 100%] in the fastest-charge data is 18 minutes. That is, the first charging time is less than the second charging time. It is assumed that the preset threshold is 70° C., and the maximum temperature 62° C. is less than 70° C. In this example, the charging data corresponding to the first charging time in the current charging process satisfies the preset fast-charge condition.

In some embodiments, the determining whether charging data in the current charging process satisfies a preset fast-charge condition includes: adding one to a cumulative number of safe charges when a maximum temperature of a battery in the current charging process is less than or equal to a preset threshold; and determining, when the number of safe charges reaches a preset number after one is added, that the charging data in the current charging process satisfies the preset fast-charge condition; or, buffering the charging data in the current charging process when the number of safe charges is less than a preset number after one is added. If the maximum temperature of the battery in the current charging process is less than or equal to the preset threshold, then the current charging process is a safe charging process, and therefore, the cumulative number of safe charges is increased by one. When the cumulative number of safe charges reaches the preset number, it is determined that the charging data in the current charging process satisfies the preset fast-charge conditions. By letting the preset fast-charge condition be that the number of safe charges reaches the preset number, it is ensured that the obtained charging data is data of safe charging. This favorably ensures the safety of the fastest-charge data that is to be subsequently updated with the data selected from the data of safe charging, and in turn, ensures the safety of the battery charging process when the thermal management policy for battery charging is executed subsequently based on the fastest-charge data.

S40. Update the fastest-charge data based on the charging data in the current charging process when the charging data in the current charging process satisfies the preset fast-charge condition; or, skip update when the charging data in the current charging process does not satisfy the preset fast-charge condition. The update of the fastest-charge data ensures that the fastest-charge data remains optimal in historical charging processes, so as to further increase the battery charging speed.

In some embodiments, the updating the fastest-charge data based on the charging data in the current charging process includes: determining a corresponding SOC increment overlap section in the fastest-charge data based on the SOC increment section corresponding to the first charging time in the current charging process; and replacing the charging data of the corresponding SOC increment overlap section in the fastest-charge data with partial charging data corresponding to the first charging time in the current charging process. In this way, the fastest-charge data is ensured to keep optimal in the historical charging processes.

For example, the SOC increment section corresponding to the first charging time in the current charging process is [50%, 100%], and the corresponding SOC increment overlap section in the fastest-charge data is [50%, 100%]. The charging data corresponding to the first charging time in the current charging process replaces the charging data of the corresponding SOC increment overlap section [50%, 100%] in the fastest-charge data.

Figure 4:
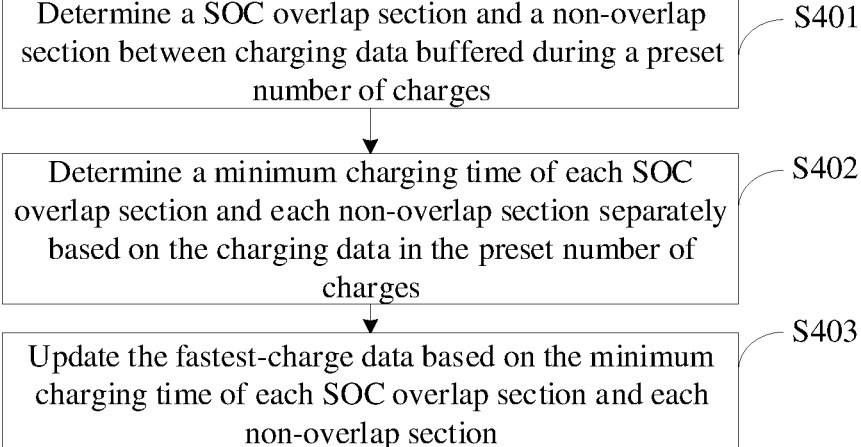
FIG. 4 is a flowchart of updating fastest-charge data based on charging data in a current charging process according to some embodiments of this application.

In some embodiments, as shown in FIG. 4, the updating the fastest-charge data based on the charging data in the current charging process includes step S401 to S403:

S401. Determine a SOC overlap section and a non-overlap section between the charging data buffered during the preset number of charges, where the SOC overlap section is a SOC increment section shared by at least two pieces of charging data.

S402. Determine a minimum charging time of each SOC overlap section and each non-overlap section separately based on the charging data in the preset number of charges.

For example, the preset number of charges is 5, and the SOC increment sections corresponding to the charging data in such charges are [45%, 98%], [90%, 100%], [22%, 98%], [78%, 96%], and [67%, 96%], respectively. In the SOC increment sections achieved on the 5 occasions of charging, non-overlap sections are, for example, [22%, 45%) and (98%, 100%], and the overlap sections are, for example, [90%, 98%], [78%, 96%], [67%, 96%], and the like.

Step S402 may include: determining, from a plurality of pieces of charging data that share a first SOC overlap section, the minimum charging time corresponding to the first SOC overlap section, where the first SOC overlap section is any one SOC overlap section of all SOC overlap sections; and determining that the charging time corresponding to the non-overlap section in the charging data pertinent to the non-overlap section is the minimum charging time corresponding to the non-overlap section. The minimum charging time of each overlap section and each non-overlap section can be searched out accurately through step S402, so as to facilitate subsequent update of the fastest-charge data.

For example, the overlap section [90%, 98%] is shared by the charging data in three charges, and the SOC increment sections in the three charges are [45%, 98%], [90%, 100%], and [22%, 98%], respectively. It is assumed that the charging times corresponding to the overlap section [90%, 98%] in the charging data of the three charges are T1, T2, and T3, respectively. Therefore, from T1, T2, and T3, the minimum charging time is selected as the minimum charging time corresponding to the overlap section [90%, 98%]. Subsequently, it is determined that the charging time corresponding to the non-overlap section [22%, 45%) in the charging data pertinent to the non-overlap section [22%, 45%) is the minimum charging time corresponding to the non-overlap section [22%, 45%). It is determined that the charging time corresponding to the non-overlap section (98%, 100%] in the charging data pertinent to the non-overlap section (98%, 100%] is the minimum charging time corresponding to the non-overlap section (98%, 100%].

S403: Update the fastest-charge data based on the minimum charging time of each SOC overlap section and each non-overlap section, so as to ensure that the fastest-charge data keeps optimal.

In some embodiments, step S403 may include: determining whether the minimum charging time for a first section is less than the charging time corresponding to the same section in the fastest-charge data, where the first section is any one section among all SOC overlap sections and all non-overlap sections; and, replacing the charging data corresponding to the same section in the fastest-charge data with partial charging data corresponding to the first section if the minimum charging time for a first section is less than the charging time corresponding to the same section in the fastest-charge data; or, skipping replacing the charging data if the contrary is true. By updating the fastest-charge data, the fastest-charge data can be ensured to remain optimal in historical charging processes. Through this step, any piece of data in the fastest-charge data can be updated.

For example, this step determines whether the minimum charging time corresponding to the overlap section [90%, 98%] is less than the charging time corresponding to the increment section [90%, 98%] in the fastest-charge data, determines whether the minimum charging time corresponding to the non-overlap section [22%, 45%) is less than the charging time corresponding to the increment section [22%, 45%) in the fastest-charge data, and so on. If the minimum charging time corresponding to the overlap section [90%, 98%] is less than the charging time corresponding to the section [90%, 98%] in the fastest-charge data, then the charging data corresponding to the section [90%, 98%] in the fastest-charge data is replaced with partial charging data corresponding to the overlap section [90%, 98%]. If the minimum charging time corresponding to the non-overlap section [22%, 45%) is less than the charging time corresponding to the increment section [22%, 45%) in the fastest-charge data, then the charging data corresponding to the increment section [22%, 45%) in the fastest-charge data is replaced with partial charging data corresponding to the section [22%, 45%).

In some embodiments, the updating the fastest-charge data based on the charging data in the current charging process includes step 1) to step 4):

Step 1): Select a random piece of charging data from the charging data buffered during the preset number of charges.

Step 2): Determine a SOC increment overlap section between the selected charging data and the fastest-charge data, and determine a first charging time corresponding to the SOC increment overlap section in the selected charging data as well as a second charging time corresponding to the SOC increment overlap section in the fastest-charge data.

Step 3): Replace, when the first charging time is less than the second charging time, the charging data of the SOC increment overlap section in the fastest-charge data with partial charging data corresponding to the first charging time in the selected charging data.

Step 4): Select a random piece of charging data again from remaining charging data, and return to cyclically perform the step of determining the SOC increment overlap section between the selected charging data and the fastest-charge data until the fastest-charge data is updated with each piece of charging data in the preset number of charges. By updating the fastest-charge data, the fastest-charge data can be ensured to remain optimal in historical charging processes.

In this example, the charging data corresponding to [22%, 98%] is randomly selected from the charging data corresponding to the SOC increment sections [45%, 98%], [90%, 100%], [22%, 98%], [78%, 96%], and [67%, 96%] buffered in 5 charging processes. The SOC increment overlap section [22%, 98%] between the selected charging data corresponding to the [22%, 98%] and the fastest-charge data is determined, and a corresponding first charging time in the selected charging data corresponding to [22%, 98%] as well as a second charging time corresponding to the SOC increment overlap section [22%, 98%] in the fastest-charge data are determined. When the first charging time is less than the second charging time, the charging data of the SOC increment overlap section [22%, 98%] in the fastest-charge data is replaced with partial charging data corresponding to the first charging time in the selected charging data. This process goes on until each piece of the charging data corresponding to the SOC increment sections [45%, 98%], [90%, 100%], [22%, 98%], [78%, 96%], and [67%, 96%] buffered in 5 charging processes has been selected once.

By obtaining the fastest-charge data and performing charging control on the battery based on the fastest-charge data, the charging control method according to this embodiment of this application can increase the charging speed, and ensure that the charging time is close to or equal to the minimum charging time in the historical charging processes.

Figure 5:
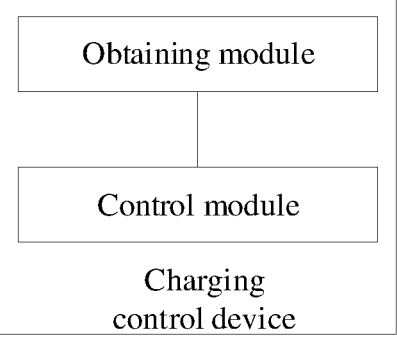
FIG. 5 is a schematic block diagram of a charging control device according to some embodiments of this application.

Another embodiment of this application provides a charging control device. As shown in FIG. 5, in some implementations, the device includes:
    an obtaining module, configured to obtain fastest-charge data, where a charging time in the fastest-charge data is less than or equal to a minimum charging time for a same state-of-charge (SOC) increment section in historical charging processes; and
    a control module, configured to perform charging control on a battery based on the fastest-charge data.

In some embodiments, the fastest-charge data includes at least one SOC increment section and a maximum battery temperature corresponding to each SOC increment section. The control module is further specifically configured to: perform thermal management control on the battery based on a current battery temperature and a maximum battery temperature corresponding to a current SOC increment section.

In some implementations, the control module includes:
    a SOC increment section determining unit, configured to determine a SOC increment section within which a real-time SOC value falls;
    a maximum battery temperature determining unit, configured to obtain, from the fastest-charge data, a maximum battery temperature corresponding to the determined SOC increment section; and
    a control and execution unit of thermal management policy of the battery, configured to perform control to execute a corresponding thermal management policy of the battery based on the real-time battery temperature and the obtained maximum battery temperature.

In some embodiments, the control and execution unit of thermal management policy of the battery includes:
    a target temperature range determining subunit, configured to determine a target temperature range corresponding to the obtained maximum battery temperature; and
    a cooling control subunit, configured to perform, when the real-time battery temperature is higher than an upper limit of the target temperature range, cooling on the battery until the real-time battery temperature is less than or equal to the upper limit; and
    a heating control subunit, configured to perform, when the real-time battery temperature is less than or equal to the lower limit of the target temperature range, heating on the battery until the real-time battery temperature is higher than the lower limit.

Figure 6:
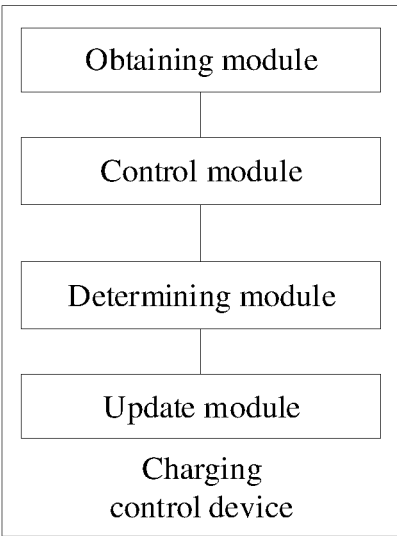
FIG. 6 is a schematic block diagram of a charging control device according to some other embodiments of this application.

As shown in FIG. 6, in some embodiments, the charging control device further includes:
    a determining module, configured to determine, after a current charging process ends, whether charging data in the current charging process satisfies a preset fast-charge condition; and
    an update module, configured to update the fastest-charge data based on the charging data in the current charging process when the charging data in the current charging process satisfies the preset fast-charge condition.

In some embodiments, the fastest-charge data includes at least one SOC increment section and a charging time corresponding to each SOC increment section, and the determining module includes a submodule configured to determine whether charging data in the current charging process satisfies a preset fast-charge condition. The submodule includes:

a first determining unit, configured to determine a maximum temperature of a battery during the current charging process;

a second determining unit, configured to determine a SOC increment overlap section between the current charging process and the fastest-charge data;

a third determining unit, configured to determine a first charging time corresponding to the SOC increment overlap section in the current charging process and determine a second charging time corresponding to the SOC increment overlap section in the fastest-charge data; and a fourth determining unit, configured to determine, when the maximum temperature is less than or equal to a preset threshold and the first charging time is less than the second charging time, that the charging data corresponding to the first charging time in the current charging process satisfies the preset fast-charge condition.

In some embodiments, the updating the fastest-charge data by the update module based on the charging data in the current charging process includes: determining a corresponding SOC increment overlap section in the fastest-charge data based on the SOC increment section corresponding to the first charging time in the current charging process; and replacing the charging data of the corresponding SOC increment overlap section in the fastest-charge data with partial charging data corresponding to the first charging time in the current charging process.

In some embodiments, the determining whether charging data in the current charging process satisfies a preset fast-charge condition includes: adding one to a cumulative number of safe charges when a maximum temperature of a battery in the current charging process is less than or equal to a preset threshold; and determining, when the number of safe charges reaches a preset number after one is added, that the charging data in the current charging process satisfies the preset fast-charge condition; or, buffering the charging data in the current charging process when the number of safe charges is less than a preset number after one is added.

In some embodiments, the updating the fastest-charge data based on the charging data in the current charging process includes: determining a SOC overlap section and a non-overlap section between the charging data buffered during the preset number of charges, where the SOC overlap section is a SOC increment section shared by at least two pieces of charging data; determining a minimum charging time of each SOC overlap section and each non-overlap section separately based on the charging data in the preset number of charges; and updating the fastest-charge data based on the minimum charging time of each SOC overlap section and each non-overlap section.

In some embodiments, the determining a minimum charging time of each SOC overlap section and each non-overlap section separately based on the charging data in the preset number of charges includes: determining, from a plurality of pieces of charging data that share a first SOC overlap section, the minimum charging time corresponding to the first SOC overlap section, where the first SOC overlap section is any one SOC overlap section of all SOC overlap sections; and determining that the charging time corresponding to the non-overlap section in the charging data pertinent to the non-overlap section is the minimum charging time corresponding to the non-overlap section.

In some embodiments, the updating the fastest-charge data based on the minimum charging time of each SOC overlap section and each non-overlap section includes: determining whether the minimum charging time for a first section is less than the charging time corresponding to the same section in the fastest-charge data, where the first section is any one section among all SOC overlap sections and all non-overlap sections; and, replacing the charging data corresponding to the same section in the fastest-charge data with partial charging data corresponding to the first section if the minimum charging time for a first section is less than the charging time corresponding to the same section in the fastest-charge data.

In some embodiments, the updating the fastest-charge data based on the charging data in the current charging process includes: selecting a random piece of charging data from the charging data buffered during the preset number of charges; determining a SOC increment overlap section between the selected charging data and the fastest-charge data, and determining a first charging time corresponding to the SOC increment overlap section in the selected charging data as well as a second charging time corresponding to the SOC increment overlap section in the fastest-charge data; replacing, when the first charging time is less than the second charging time, the charging data of the SOC increment overlap section in the fastest-charge data with partial charging data corresponding to the first charging time in the selected charging data; and selecting a random piece of charging data again from remaining charging data, and returning to cyclically perform the step of determining the SOC increment overlap section between the selected charging data and the fastest-charge data until the fastest-charge data is updated with each piece of charging data in the preset number of charges.

Another embodiment of this application provides an electronic device, including a memory, a processor, and a computer program stored in the memory and executable on the processor. The processor executes the program to implement the charging control method according to any one of the embodiments described above.

Figure 7:
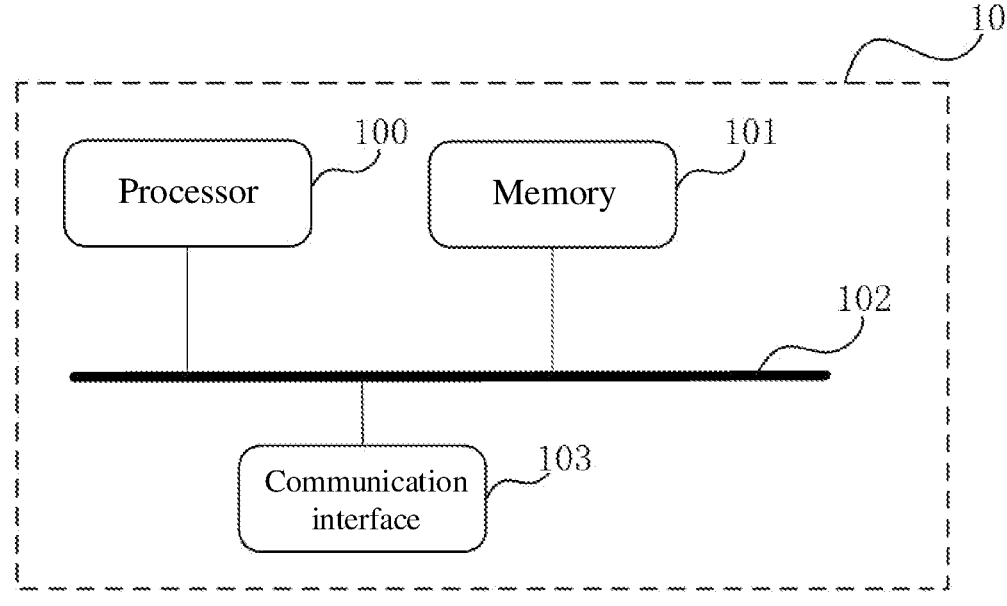
FIG. 7 is a structural block diagram of an electronic device according to some embodiments of this application.

As shown in FIG. 7, the electronic device 10 may include: a processor 100, a memory 101, a bus 102, a communication interface 103. The processor 100, the communication interface 103, and the memory 101 are connected together by the bus 102. A computer program executable on the processor 100 is stored in the memory 101. When running the computer program, the processor 100 performs the method according to any one of the embodiments of this application described above.

The memory 101 may include a high-speed random access memory (RAM), or may further include a non-volatile memory such as at least one disk memory. The communication connection between the system network element and at least one other network element is implemented through at least one communication interface 103 (either wired or wireless) by using the Internet, a wide area network, a local network, a metropolitan area network, or the like.

The bus 102 may be an ISA bus, a PCI bus, an EISA bus, or the like. The bus may be classed into an address bus, a data bus, a control bus, and the like. The memory 101 is configured to store a program. The processor 100 executes the program upon receiving an execution instruction. The method disclosed in any one embodiment of this application above is applicable in the processor 100, or may be implemented by the processor 100.

The processor 100 may be an integrated circuit chip capable of processing signals. In an implementation process, steps of the foregoing method may be implemented by an integrated logical circuit in the hardware form or by instructions in the software form in the processor 100. The processor 100 may be a general-purpose processor, such as a central processing unit (CPU) or a network processor (NP); and may be a digital signal processor (DSP), an application-specific integrated circuit (ASIC), a field programmable gate array (FPGA) or another programmable logical device, a discrete gate or a transistor logical device, or a discrete hardware component. The processor can implement or perform the methods, steps, and logic block diagrams disclosed in an embodiment of this application. The general-purpose processor may be a microprocessor, or the processor may be any conventional processor or the like. The steps of the method disclosed in an embodiment of this application may be directly performed by a hardware decoding processor, or performed by a combination of hardware and software modules in the decoding processor. The software modules may be located in a mature storage medium in the art, such as a random access memory, a flash memory, a read-only memory, a programmable read-only memory, an electrically erasable programmable memory, a register, or the like. The storage medium is located in the memory 101, and the processor 100 reads information in the memory 101 and completes the steps of the method in combination with hardware of the processor.

The electronic device disclosed in an embodiment of this application is based on the same inventive concept as the method disclosed in an embodiment of this application, and brings the same beneficial effects as the method adopted, operated, or implemented by the electronic device.

Another embodiment of this application provides a computer-readable storage medium on which a computer program is stored. A processor executes the program to implement the charging control method according to any one of the embodiments described above.

Figure 8:
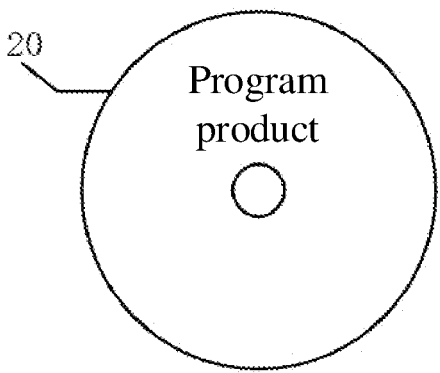
FIG. 8 is a schematic diagram of a computer-readable storage medium according to some embodiments of this application.

Another embodiment of this application further provides a computer-readable storage medium corresponding to the method provided in the preceding embodiment. Referring to FIG. 8, which shows a compact disc 20 as a computer-readable storage medium, the computer-readable storage medium stores a computer program (that is, program product). When executed by the processor, the computer program performs the method disclosed in any one of the embodiments described above.

It is hereby noted that examples of the computer-readable storage medium may further include, but are not limited to, a phase change memory (PRAM), a static random access memory (SRAM), a dynamic random access memory (DRAM), other types of random access memories (RAMs), a read-only memory (ROM), an electrically erasable programmable read only memory (EEPROM), a flash memory or other optical or magnetic storage media, details of which are omitted here.

The computer-readable storage medium disclosed in the above embodiment of this application is based on the same inventive concept as the method disclosed in an embodiment of this application, and brings the same beneficial effects as the method adopted, operated, or implemented by the program stored in the computer-readable storage medium.

Another embodiment of this application provides a powered apparatus. The powered apparatus includes a power battery and the electronic device according to any one of the embodiments described above. The power battery is configured to provide electrical energy. The electronic device is configured to perform the charging control method according to any one of the embodiments on the power battery. The powered apparatus may be, for example, an electric means of transport such as an electric vehicle.

A person of ordinary skill in the art is aware that the exemplary units and algorithm steps described with reference to an embodiment disclosed herein can be implemented by electronic hardware or by a combination of computer software and electronic hardware. Whether the functions are performed by hardware or software depends on particular applications and design constraint conditions of the technical solutions. A person skilled in the art may use different methods to implement the described functions for each particular application, but such implementation still falls within the scope of this application.

A person skilled in the art clearly understands that, for ease and brevity of description, a detailed working process of the foregoing system, apparatus, and unit may be learned by reference to a corresponding process in the foregoing method embodiments, details of which are omitted here.

In the several embodiments provided in this application, it is understandable that the disclosed system, apparatus, and method may be implemented in other manners. For example, the described device embodiment is merely illustrative. For example, the division of the device into several units is merely a type of logic function division, and the device may be divided in other manners in practical implementations. For example, a plurality of units or components may be combined or integrated into another system, or some features may be ignored or skipped. In addition, a mutual coupling or direct coupling or communication connection illustrated or discussed herein may be an indirect coupling or communication connection implemented through some interfaces, devices, or units, and may be in electrical, mechanical or other forms.

The units described as stand-alone components above may be separated physically or not. The components illustrated as units may be physical units or not, and specifically, may be located in one place, or distributed on a plurality of network elements. Some or all of the units may be selected according to actual needs to achieve the objectives of the solutions of the embodiments hereof.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the essence of the technical solution of this application, or the part making contributions to the prior art, or a part of the technical solution may be embodied in the form of a software product. The computer software product is stored in a storage medium, and includes several instructions for instructing a computer device (such as a personal computer, a server, a network device) to perform all or part of the steps of the method described in each embodiment of this application. The foregoing storage medium includes any medium that can store program code, such as a USB flash drive, a removable hard disk, a read-only memory (ROM), a random access memory (RAM), a magnetic disk, a compact disc, or the like.

The foregoing descriptions are merely specific implementations of this application, but are not intended to limit the protection scope of this application. Any and all variations or replacements easily conceivable by a person skilled in the art within the technical scope disclosed herein still fall within the protection scope of this application. Therefore, the protection scope of this application is subject to the protection scope of the claims.

What is claimed is:

1. A charging control method for a battery configured to provide power to a vehicle, comprising:

obtaining fastest-charge data of the battery, wherein the fastest-charge data comprises a plurality of state-of-charge (SOC) increment sections, a charging time corresponding to each SOC increment section, and a maximum battery temperature corresponding to each SOC increment section, wherein the charging time corresponding to each SOC increment section in the fastest-charge data is less than or equal to a minimum charging time for the same SOC increment section in historical charging processes; and performing charging control on the battery based on the fastest-charge data;

wherein performing charging control on the battery based on the fastest-charge data comprises:

obtaining a real-time SOC value and a real-time temperature of the battery;

determining a SOC increment section within which the real-time SOC value falls;

obtaining, from the fastest-charge data, a maximum battery temperature corresponding to the determined SOC increment section;

performing control to execute a corresponding thermal management policy of the battery based on the real-time battery temperature and the obtained maximum battery temperature;

determining after a current charging process ends, whether charging data in the current charging process satisfies a preset fast-charge condition; and updating the fastest-charge data based on the charging data in the current charging process when the charging data in the current charging process satisfies the preset fast-charge condition.

2. The method according to claim 1, wherein performing control to execute a corresponding thermal management policy of the battery based on the real-time battery temperature and the obtained maximum battery temperature comprises:

determining a target temperature range corresponding to the obtained maximum battery temperature; and performing, when the real-time battery temperature is higher than an upper limit of the target temperature range, cooling on the battery until the real-time battery temperature is less than or equal to the upper limit; or performing, when the real-time battery temperature is less than or equal to a lower limit of the target temperature range, heating on the battery until the real-time battery temperature is higher than the lower limit.

3. The method according to claim 1, wherein determining whether charging data in the current charging process satisfies a preset fast-charge condition comprises:

determining a maximum temperature of a battery during the current charging process;

determining a SOC increment overlap section between the current charging process and the fastest-charge data;

determining a first charging time corresponding to the SOC increment overlap section in the current charging process and determining a second charging time corresponding to the SOC increment overlap section in the fastest-charge data; and determining, when the maximum temperature is less than or equal to a preset threshold and the first charging time is less than the second charging time, that the charging data corresponding to the first charging time in the current charging process satisfies the preset fast-charge condition.

4. The method according to claim 3, wherein updating the fastest-charge data based on the charging data in the current charging process comprises:

determining a corresponding SOC increment overlap section in the fastest-charge data based on the SOC increment section corresponding to the first charging time in the current charging process; and replacing the charging data of the corresponding SOC increment overlap section in the fastest-charge data with partial charging data corresponding to the first charging time in the current charging process.

5. The method according to claim 1, wherein determining whether charging data in the current charging process satisfies a preset fast-charge condition comprises:

adding one to a cumulative number of safe charges when a maximum temperature of a battery in the current charging process is less than or equal to a preset threshold; and determining, when the number of safe charges reaches a preset number after one is added, that the charging data in the current charging process satisfies the preset fast-charge condition; or buffering the charging data in the current charging process when the number of safe charges is less than a preset number after one is added.

6. The method according to claim 5, wherein updating the fastest-charge data based on the charging data in the current charging process comprises:

determining a SOC overlap section and a non-overlap section between the charging data buffered during the preset number of charges, wherein the SOC overlap section is a SOC increment section shared by at least two pieces of charging data;

determining a minimum charging time of each SOC overlap section and each non-overlap section separately based on the charging data in the preset number of charges; and updating the fastest-charge data based on the minimum charging time of each SOC overlap section and each non-overlap section.

7. The method according to claim 6, wherein determining the minimum charging time of each SOC overlap section and each non-overlap section separately based on the charging data in the preset number of charges comprises:

determining, from a plurality of pieces of charging data that share a first SOC overlap section, the minimum charging time corresponding to the first SOC overlap section, wherein the first SOC overlap section is any one SOC overlap section of all SOC overlap sections; and determining that the charging time corresponding to the non-overlap section in the charging data pertinent to the non-overlap section is the minimum charging time corresponding to the non-overlap section.

8. The method according to claim 6, wherein updating the fastest-charge data based on the minimum charging time of each SOC overlap section and each non-overlap section comprises:

determining whether the minimum charging time for a first section is less than the charging time corresponding to a same section in the fastest-charge data, wherein the first section is any one section among all SOC overlap sections and all non-overlap sections; and replacing the charging data corresponding to the same section in the fastest-charge data with partial charging data corresponding to the first section when the minimum charging time for a first section is less than the charging time corresponding to the same section in the fastest-charge data.

9. The method according to claim 5, wherein updating the fastest-charge data based on the charging data in the current charging process comprises:

selecting a random piece of charging data from the charging data buffered during the preset number of charges;

determining a SOC increment overlap section between the selected charging data and the fastest-charge data, and determining a first charging time corresponding to the SOC increment overlap section in the selected charging data as well as a second charging time corresponding to the SOC increment overlap section in the fastest-charge data;

replacing, when the first charging time is less than the second charging time, the charging data of the SOC increment overlap section in the fastest-charge data with partial charging data corresponding to the first charging time in the selected charging data; and selecting a random piece of charging data again from remaining charging data, and returning to cyclically perform the step of determining the SOC increment overlap section between the selected charging data and the fastest-charge data until the fastest-charge data is updated with each piece of charging data in the preset number of charges.

10. A non-transitory computer-readable storage medium on which a computer program is stored, wherein the program is executed by a processor to implement the method according to claim 1.

11. A charging control device, comprising:

an obtaining module, configured to obtain fastest-charge data of a battery, wherein the fastest-charge data comprises a plurality of state-of-charge (SOC) increment sections, a charging time corresponding to each SOC increment section, and a maximum battery temperature corresponding to each SOC increment section wherein the charging time corresponding to each SOC increment section in the fastest-charge data is less than or equal to a minimum charging time for the same SOC increment section in historical charging processes; and a control module, configured to perform charging control on the battery based on the fastest-charge data;

wherein in performing charging control on the battery based on the fastest-charge data, the control module is configured to:

obtain a real-time SOC value and a real-time temperature of the battery;

determine a SOC increment section within which the real-time SOC value falls;

obtain, from the fastest-charge data, a maximum battery temperature corresponding to the determined SOC increment section;

perform control to execute a corresponding thermal management policy of the battery based on the real-time battery temperature and the obtained maximum battery temperature;

determine, after a current charging process ends, whether charging data in the current charging process satisfies a preset fast-charge condition; and update the fastest-charge data based on the charging data in the current charging process when the charging data in the current charging process satisfies the preset fast-charge condition.

12. An electronic device, comprising a memory, a processor, and a computer program stored in the memory and executable on the processor, wherein the processor executes the program to implement a method that comprises:

obtaining fastest-charge data of a battery, wherein the fastest-charge data comprises a plurality of state-of-charge (SOC) increment sections, a charging time corresponding to each SOC increment section, and a maximum battery temperature corresponding to each SOC increment section, wherein the charging time corresponding to each SOC increment section in the fastest-charge data is less than or equal to a minimum charging time for the same SOC increment section in historical charging processes; and performing charging control on the battery based on the fastest-charge data;

wherein performing charging control on the battery based on the fastest-charge data comprises:

obtaining a real-time SOC value and a real-time temperature of the battery:

determining a SOC increment section within which the real-time SOC value falls;

obtaining, from the fastest-charge data, a maximum battery temperature corresponding to the determined SOC increment section;

performing control to execute a corresponding thermal management policy of the battery based on the real-time battery temperature and the obtained maximum battery temperature;

determining after a current charging process ends whether charging data in the current charging process satisfies a preset fast-charge condition; and updating the fastest-charge data based on the charging data in the current charging process when the charging data in the current charging process satisfies the preset fast-charge condition.

13. A powered apparatus, comprising a power battery and the electronic device according to claim 12, wherein the power battery is configured to provide electrical energy to the powered apparatus.

\* \* \* \* \*